United States Patent Office.

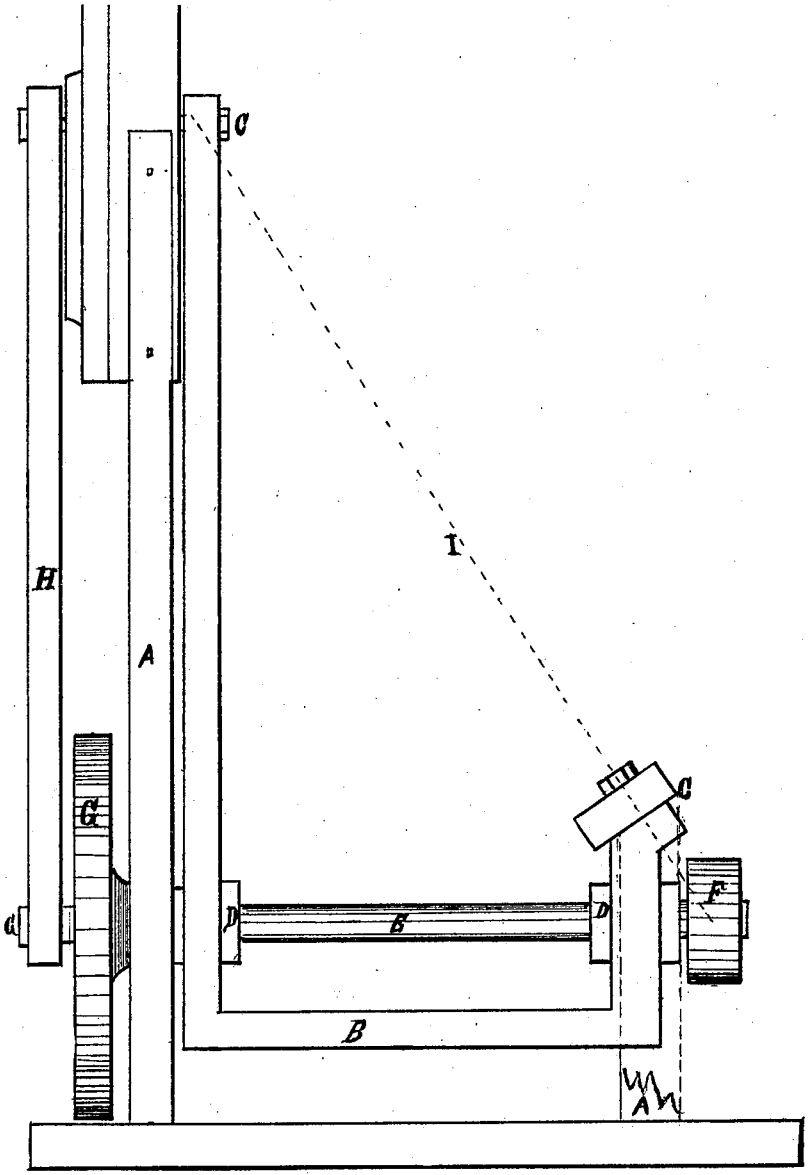

JAMES M. BEUGLER, OF WILLIAMSPORT, PENNSYLVANIA.

Letters Patent No. 100,004, dated February 22, 1870.

IMPROVEMENT IN HANGING CRANK-SHAFTS.

The Schedule referred to in these Letters Patent and making part of the same.

*To all whom it may concern:*

Be it known that I, JAMES M. BEUGLER, of Williamsport, in the county of Lycoming, and State of Pennsylvania, have made a new and valuable Improvement to supercede the necessity of building strong and heavy foundations to secure Crank-Shafts in a fixed position, by allowing the crank end of the shaft to vibrate freely and accommodate itself to any throw or side movement caused by rapid motion, heavy labor, &c.; and I do declare that the following is a full, clear, and exact description thereof, reference being had to the accompanying drawing forming part of this specification.

To enable others skilled in the art to perform with my invention, I will proceed to describe its construction and operation.

To use my invention for placing the crank-shaft in position for use,

First, construct a frame, A, suitable for the purposes intended to be accomplished by the power used.

Second, hang to it the frame B by bolts or ball-joints C; into the frame B place the boxes D; into the boxes D insert the crank-shaft E; on the end of the crank-shaft E place the pulley F, the center of which must be on line with bolts or ball-joints C C; on the other end of the shaft place the crank-wheel and wrist-pin, G G, on which attach the pitman H.

The dotted line I between C C represents the centers of joint C C and pulley, F, on shaft E. The crank-whe l G must have sufficient counterbalance to equal the weight of the driven parts attached to the wrist-pin G, which, when properly done will throw all vibrations laterally on box D, which when allowed to move or vibrate laterally, as herein described, will do away with all other foundations for crank-shafts, except to support the machine and work.

Having described a swing frame with the box D firmly attached thereto, and the crank-shaft E placed therein to attain the object desired, I do not wish to be confined to that particular form of machinery, as the same may be attained by allowing the box D on the crank end of the shaft to slide in a slot prepared for it, or other devices, to allow the shaft to vibrate laterally.

What I claim, and desire to secure by Letters Patent, is—

The application to crank-shafts of a swinging or sliding-box which will allow the crank-shaft to vibrate freely of its own accord, as herein described.

Witness my hand and seal in the matter of my application for Letters Patent on improvement in hanging crank-shafts.

JAMES M. BEUGLER. [L. S.]

Witnesses:
GEO. R. VOSBURG,
JOHN DUBOIS.